US006862444B2

(12) United States Patent
Karaoguz et al.

(10) Patent No.: US 6,862,444 B2
(45) Date of Patent: Mar. 1, 2005

(54) BILLING CONTROL METHODS IN WIRELESS HOT SPOTS

(75) Inventors: Jeyhan Karaoguz, Irvine, CA (US); Nambi Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 99 days.

(21) Appl. No.: 10/315,186

(22) Filed: Dec. 10, 2002

(65) Prior Publication Data

US 2004/0053599 A1 Mar. 18, 2004

Related U.S. Application Data

(60) Provisional application No. 60/409,937, filed on Sep. 12, 2002.

(51) Int. Cl.[7] .............................................. H04M 11/00
(52) U.S. Cl. ................. 455/408; 455/422.1; 455/426.2; 455/432.3; 455/456.2
(58) Field of Search ................................. 455/3.04, 405, 455/406, 407, 408, 411, 414.1, 422.1, 426.1, 426.2, 432.2, 435.1, 436, 432.3, 456.2; 379/112.01, 112.06, 114.03, 114.05, 114.07, 114.1, 114.13, 133, 134; 370/328, 468

(56) References Cited

U.S. PATENT DOCUMENTS

| 6,535,726 B1 | * | 3/2003 | Johnson ..................... 455/406 |
| 6,795,700 B2 | * | 9/2004 | Karaoguz et al. ........... 455/408 |
| 2002/0191575 A1 | * | 12/2002 | Kalavade et al. ........... 370/338 |
| 2003/0051041 A1 | * | 3/2003 | Kalavade et al. ........... 709/229 |
| 2003/0182431 A1 | * | 9/2003 | Sturniolo et al. ........... 709/227 |
| 2004/0037255 A1 | * | 2/2004 | Joong et al. ................ 370/338 |
| 2004/0053609 A1 | * | 3/2004 | Karaoguz et al. ........... 455/424 |
| 2004/0133806 A1 | * | 7/2004 | Joong et al. ................ 713/201 |

OTHER PUBLICATIONS

"IEEE 802.11, A Technical Overview," Pablo Brenner, BreezeNet website, Jul. 8, 1997, www.sss-mag.com/pdf/80211p.pdf.

Donny Jackson, Telephony, Ultrawideband May Thwart 802.11, Bluetooth Efforts, PRIMEDIA Business Magazines & Media Inc., Feb. 11, 2002.

Daniel L. Lough, et al., "A Short Tutorial on Wireless LANs and IEEE 802.11," The IEEE Computer Society's Student Newsletter, Virginia Polytechnic Institute and State University, Summer 1997, vol. 5, No. 2.

Dr. Robert J. Fontana, "A Brief History of UWB Communications," Multispectral.com, Multispectral Solutions, Inc., www.multispectral.com/history.html, Aug. 20, 2002.

Gerald F. Ross, "Early Motivations and History of Ultra Wideband Technology," Anro Engineering, Inc., Multispectral.com, Multispectral Solutions, Inc., www.multispectral.com/history.html, Aug. 20, 2002.

Dr. Terence W. Barrett, "History of UltraWideband (UWB) Radar & Communications: Pioneers and Innovators," Proceedings and Progress in Electromagnetics Symposium 2000 (PIERS2000), Cambridge, MA, Jul. 2000.

(List continued on next page.)

Primary Examiner—Binh Tieu
(74) Attorney, Agent, or Firm—Squire, Sanders & Dempsey L.L.P.

(57) ABSTRACT

A process of billing for access to and use of a wireless hotspot by a portable device is disclosed. A signal from the wireless hotspot is detected and access to the wireless hotspot is requested. The portable device awaits reply to the access request from the wireless hotspot and supplies account information to an access providing entity. Next, the portable device awaits a billing authorization from the access providing entity and, thereafter, data is exchanged with the wireless hotspot by the portable device when a billing authorized is received from the access providing entity. The account information is used to keep track of charges accrued through the access to and use of the wireless hotspot by the portable device.

63 Claims, 7 Drawing Sheets

OTHER PUBLICATIONS

Dr. Henning F. Harmuth, "An Early History of Nonsinusoidal Electromagnetic Technologies," Multispectral.com, Multispectral Solutions, Inc., www.multispectral.com/history.html, Aug. 20, 2002.

Rebecca Taylor, "Hello, 802.11b AND Bluetooth: Let's Not Be Stupid!", ImpartTech.com, www.ImportTech.com/802.11–bluetooth.htm, Aug. 21, 2002.

Matthew Peretz, "802.11, Bluetooth Will Co–Exist: Study," 802.11–Planet.com, INT Media Group, Inc., Oct. 30, 2001.

"Bluetooth and 802.11: A Tale of Two Technologies," 10Meters.com, www.10meters.com/blue_802.html, Dec. 2, 2000.

Keith Shaw, "Bluetooth and Wi–Fi: Friends or foes?", Network World Mobile Newsletter, Network World, Inc., Jun. 18, 2001.

Joel Conover, "Anatomy of IEEE 802.11b Wireless," NetworkComputing.com, Aug. 7, 2000.

Bob Brewin, "Intel, IBM Push for Public Wireless LAN," Computerworld.com, Computerworld Inc., Jul. 22, 2002.

Ernest Khoo, "A CNET tutorial: What is GPRS?", CNETAsia, CNET Networks, Inc., Feb. 7, 2002.

Les Freed, "Et Tu, Bluetooth?", ExtremeTech.com, Ziff Davis Media Inc., Jun. 25, 2001.

Bluetooth & 802.11b—Part 1, www.wilcoxonwireless.com/whitepapers/bluetoothvs802.doc , Jan. 2002.

Bob Brewin, "Report: IBM, Intel, Cell Companies Eye National Wi–Fi Net," Computerworld.com, Computerworld Inc., Jul. 16, 2002.

Bob Brewin, "Microsoft Plans Foray Into Home WLAN Device Market," Computerworld.com, Computerworld Inc., Jul. 22, 2002.

Bob Brewin, "Vendors Field New Wireless LAN Security Products," Computerworld.com, Computerworld Inc., Jul. 22, 2002.

Jeff Tyson, "How Wireless Networking Works," Howstuffworks.com, Howstuffworks, Inc., www.howstuffworks.com/wireless-network.htm/printable, Aug. 15, 2002.

Curt Franklin, "How Bluetooth Works," Howstuffworks.com, Howstuffworks, Inc., www.howstuffworks.com/bluetooth.htm/printable, Aug. 15, 2002.

802.11b Networking News, News for Aug. 19, 2002 through Aug. 11, 2002, 80211b.weblogger.com/, Aug. 11–19, 2002.

"Wireless Ethernet Networking with 802.11b, An Overview," HomeNetHelp.com, Anomaly, Inc., www.homenethelp.com/80211.b/index.asp, Aug. 20, 2002.

"Simple 802.11b Wireless Ethernet Network with an Access Point," HomeNetHelp.com, Anomaly, Inc., www.homenethelp.com/web/diagram/access–point.asp, Aug. 20, 2002.

"Simple 802.11b Wireless Ethernet Network without an Access Point," HomeNetHelp.com, Anomaly, Inc., www.homenethelp.com/web/diagram/ad–hoc.asp, Aug. 20, 2002.

"Cable/DSL Router with Wired and Wireless Ethernet Built In," HomeNetHelp.com, Anomaly, Inc., www.homenethelp.com/web/diagram/share–router–wireless.asp, Aug. 20, 2002.

"Bridging a Wireless 802.11b Network with a Wired Ethernet Network," HomeNetHelp.com, Anomaly, Inc., www.homenethelp.com/web/diagram/wireless–bridged.asp, Aug. 20, 2002.

"Wireless Access Point (802.11b) of the Router Variety," HomeNetHelp.com, Anomaly, Inc., www.homenethelp.com/web/diagram/share–wireless–ap.asp, Aug. 20, 2002.

Robert Poe, "Super–Max–Extra–Ultra–Wideband!", Business2.com, Oct. 10, 2000.

David G. Leeper, "Wireless Data Blaster," ScientificAmerican.com, Scientific American, Inc., May 4, 2002.

Steven J. Vaughan–Nichols, "Ultrawideband Wants to Rule Wireless Networking," TechUpdate.ZDNet.com, Oct. 30, 2001.

Jim Zyren and Al Petrick, "Brief Tutorial on IEEE 802.11 Wireless LANs," AN9829, Intersil Corporation, Feb. 1999.

"Overview of UWB?", PulseLink.net, Pulse~LINK, Inc., www.pulselink.net/ov_history.html, Sep. 4, 2002.

Robert X. Cringely, "The 100 Mile–Per–Gallon Carburetor—How Ultra Wide Band May (or May Not) Change the World," Interesting–People.org, Jan. 26, 2002.

William A. Kissick, Editor, "The Temporal and Spectral Characteristics of Ultrawideband Signals," NTIA Report 01–383, Jan. 2001, www.its.bldrdoc.gov/pub/ntia–rpt/01–383/.

"Ultra Wide Band," www.ida.gov.sg/Website/IDAContent.nsf/dd1521f1e79ecf3bc825682f0045a349/1856626048baf403c82569880267e26%FOpenDocument+%22Full+duplex+UWB+handheldtransceiver%22&hl=en&ie=UTF–8, Aug. 20, 2002.

* cited by examiner

BILLING CONTROL METHODS IN WIRELESS HOT SPOTS

REFERENCE TO RELATED APPLICATIONS

This application claims priority of U.S. Provisional Patent Application Ser. No. 60/409,937, filed on Sep. 12, 2002. The subject matter of this earlier filed application is hereby incorporated by reference.

BACKGROUND OF THE INVENTION

1. Field of Invention

The present invention relates to devices and networks that utilize wireless computer networks and methods of remuneration for access to and exchange of data through the wireless computer networks. The present invention further relates to devices and networks that allow for proper billing of users to occur seamlessly through use of the wireless computer networks. More specifically, the present invention is directed to different methodologies that allow for verification and billing of users of the wireless computer networks based on the type or types of accounts that the users have with various entities.

2. Description of Related Art

The emergence of what are commonly called wireless hotspots has increased the mobility of wireless users and allowed mobile users to access network resources without requiring a physical connection to a main network. Many of these wireless hotspots have appeared in commercial and non-commercial establishments such as coffee shops and libraries, and allow users with wireless communication equipment to communicate with local area networks and wide area networks as they move about. The locations that provide the access do so to attract customers, such as in the case of coffee shops, or because they see such access as an extension of their public interest, in the case of public libraries. However, the equipment, monitoring and access services are not free, and the provider of the hotspot has to bear the burden of those expenses. As an example, a T-1 digital connection can cost approximately $1000 per month at 2002 rates to provide such a level of service. If the expansion of wireless hotspots is to continue so that they become ubiquitous, one possibility is for the persons using the hotspots should take up some portion of the costs.

However, many of the hotspot locations, as discussed above, are run by small establishments and do not have the means to offer the authenticating and billing systems which would be necessary to effectively allocate costs to different users. Even when wireless hotspots are run by larger establishments, those larger establishments do not have the infrastructure to allow for users to pay for their access to the hotspot. In other words, a large scale establishment that sells coffee in many locations does not necessarily have a system that allows users to log on to their access points and be billed for their usage. It is also not clear that such establishments should attempt to offer such systems themselves since this is not their main business focus. One possibility is to have some other entity offer the systems that allow for wireless hotspot users to access the network and to pay for their usage. This also has the benefit of relieving the wireless hotspot establishments from overseeing and controlling the functions of the hotspot.

As such, there is a need for a method or mechanism in the prior art that can provide for proper billing of wireless device users for their access to the wireless network that is not specific to a certain hotspot and allows for users to roam to different locations. In addition, there is also a need for a method or mechanism in the prior art that can allow users to be billed and allows for the proprietors of the hotspots to be relieved of the burden of billing the users for their usage.

SUMMARY OF THE INVENTION

According to one aspect of this invention, a process of billing for access to and use of a wireless hotspot by a portable device is disclosed. A signal from the wireless hotspot is detected and access to the wireless hotspot is requested. The portable device awaits reply to the access request from the wireless hotspot and supplies account information, to be used for billing, to an access providing entity. Next, the portable device awaits a billing authorization from the access providing entity and, thereafter, data is exchanged with the wireless hotspot by the portable device when a billing authorized is received from the access providing entity. In this embodiment, the account information is used to keep track of charges accrued through the access to and use of the wireless hotspot by the portable device.

Alternatively, account information may be supplied to the wireless hotspot or to a service provider. The service provider may be a wireless telephone service provider, wherein the account information is one of a wireless telephone number and a wireless telephone account number or the service provider may be a landline telephone service provider, wherein the account information is one of a landline telephone number and a landline telephone account number. Additionally, the service provider may be a third party service provider, wherein the third party service provider receives the account information and transfers data specific to one of a landline telephone service provider, a wireless telephone service provider and an internet service provider, where the specific data is used to keep track of charges accrued through the access to and use of the wireless hotspot by the portable device.

The process may include supplying account information to a wireless telephone service provider through a wireless telephone portion of the portable device or through a wireless telephone that is separate from the portable device. Also, the data exchanged with the wireless hotspot by the portable device may be via at least one of an IEEE 802.11 format, an IEEE 802.15.3 format, a BLUETOOTH™, short-range wireless communication standard, format and an ultra wideband format.

According to another embodiment of this invention, a process of billing for access to and use of a wireless hotspot by a portable device is disclosed. A signal inviting portable devices to seek access to the wireless hotspot is sent and the wireless hotspot awaits a reply to the signal from the portable device. Account information, to be used for billing, is requested, with the account information being specific to an access providing entity. Authorization information is received from one of the portable device and the access providing entity and access to the wireless hotspot is authorized by the portable device, when the received authorization information is determined to authorize access to the wireless hotspot. Thereafter, data is exchanged with the wireless hotspot by the portable device subsequent to authorizing access to the wireless hotspot. The account information is used to keep track of charges accrued through the access to and use of the wireless hotspot by the portable device. Additionally, the process may also include the steps of monitoring the use of the wireless hotspot by the portable device and generating billing information related to the monitored use of the wireless hotspot by the portable device. The process may also include sending the generated billing information to the access providing entity or generating a bill based on the billing information by the wireless hotspot.

In another embodiment, a billing processor for billing of access to and use of a wireless hotspot by a portable device is disclosed. The billing processor includes detecting means for detecting a signal from the wireless hotspot and requesting means for requesting access to the wireless hotspot. The billing processor also includes first timing means for awaiting a reply to the access request from the wireless hotspot, supplying means for supplying account information, to be used for billing, to an access providing entity and second timing means for awaiting a billing authorization from the access providing entity. The billing processor also includes communication means for exchanging data with the wireless hotspot by the portable device when a billing authorized is received from the access providing entity, wherein the account information is used to keep track of charges accrued through the access to and use of the wireless hotspot by the portable device.

According to another embodiment a billing processor for billing of access to and use of a wireless hotspot by a portable device is disclosed. The billing processor includes sending means for sending a signal inviting portable devices to seek access to the wireless hotspot, timing means for awaiting a reply to the signal from the portable device and requesting means for requesting account information, to be used for billing, with the account information being specific to an access providing entity. The billing processor also includes receiving means for receiving authorization information from one of the portable device and the access providing entity; authorizing means for authorizing access to the wireless hotspot by the portable device, when the received authorization information is determined to authorize access to the wireless hotspot and communications means for exchanging data with the wireless hotspot by the portable device subsequent to authorizing access to the wireless hotspot. The account information is used to keep track of charges accrued through the access to and use of the wireless hotspot by the portable device.

In another embodiment, a billing processor for billing of access to and use of a wireless hotspot by a portable device is disclosed. The billing processor includes a detector for detecting a signal from the wireless hotspot, a requestor for requesting access to the wireless hotspot, a first timer for awaiting a reply to the access request from the wireless hotspot and a supplier for supplying account information, to be used for billing, to an access providing entity. The billing processor also includes a second timer for awaiting a billing authorization from the access providing entity and a communicator for exchanging data with the wireless hotspot by the portable device when a billing authorized is received from the access providing entity, wherein the account information is used to keep track of charges accrued through the access to and use of the wireless hotspot by the portable device.

According to an alternate embodiment, a billing processor for billing of access to and use of a wireless hotspot by a portable device is disclosed. The billing processor includes a sender for sending a signal inviting portable devices to seek access to the wireless hotspot, a timer for awaiting a reply to the signal from the portable device and a requester for requesting account information, to be used for billing, with the account information being specific to an access providing entity. The billing processor also includes a receiver for receiving authorization information from one of the portable device and the access providing entity, an authorizer for authorizing access to the wireless hotspot by the portable device, when the received authorization information is determined to authorize access to the wireless hotspot and a communicator for exchanging data with the wireless hotspot by the portable device subsequent to authorizing access to the wireless hotspot. The account information is used to keep track of charges accrued through the access to and use of the wireless hotspot by the portable device.

These and other aims of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

The examples of the present invention discussed below provides a system and a method for billing of use of wireless hotspots. The billing control system allows for users of wireless devices within the hotspot area to identify themselves and seek authorization from a billing party. In one embodiment, the billing party could be a wireless telephone service provider or in other embodiments the billing party may be a third party company and the wireless telephone service provider would be billing affiliates that are identified by the third party company. Additionally, the wireless hotspot itself can be used to monitor and secure billing information. After or during use of the hotspot, a bill for the user is generated and payments to billing affiliates are allocated, if any. According to this billing control process, a user would receive a single bill, with charges for both the wireless hotspot usage and other charges from the billing party.

The present invention can provide the benefit of relieving the wireless hotspot establishments from overseeing and controlling the functions of the hotspot. At the same time, because of how the control and access are established, the users may pay for their usage of the hotspot and this also relieves some or all of the cost of providing the wireless hotspot. There are several candidates that can offer these services for the wireless hotspot establishments, as discussed below.

One candidate for offering these services is landline-based telephone and wireless telephone providers, where those providers already provide landline, cellular and other wireless telephone data services to their users. The providers also have an infrastructure and data storage used to secure billing data for users and are based on a data backbone. Following a similar model as that used for non-mobile and mobile telephones, access to wireless hotspots can be coordinated through wireless telephone service providers and landline-based telephone service providers, with the telephone service providers assisting in authenticating of users, monitoring of usage, and billing of users through their infrastructures.

Another candidate for offering wireless hotspot services would be a third party that supplies services, such as higher level layers of the network interface, to the wireless hotspot locations, provides authentication of users and processes and forwards billing information to billing party. The third party can also manage the billing process, culling together different access sessions and services. Thus, the third party would provide the interface between the hotspots and an entity with which the user of the hotspot has an account. The third party could be a telephone company or a wireless telephone company or some other service provider.

Figure 1:
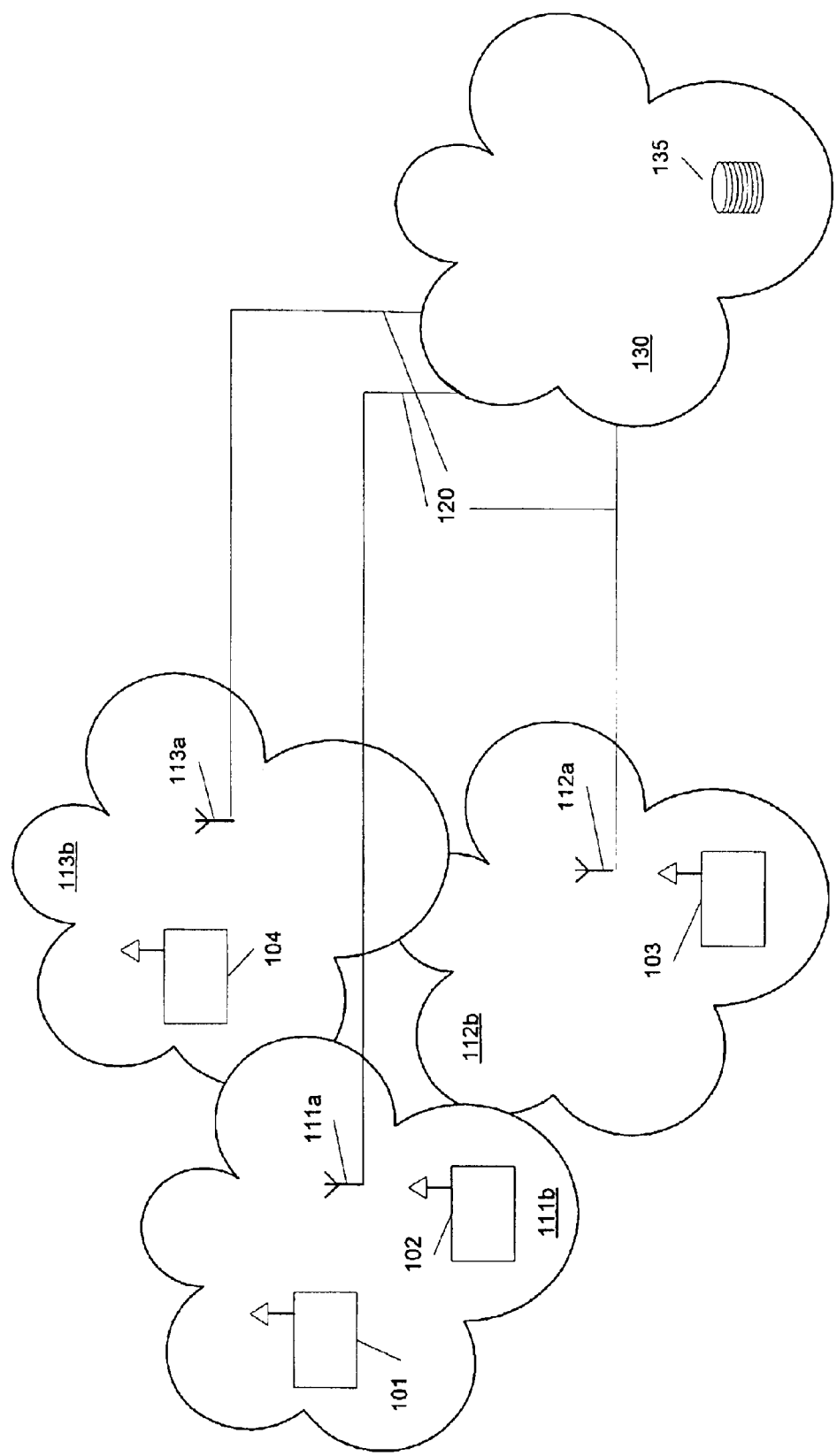
FIG. 1 is a schematic representation of a wireless telephone system having multiple cells, according to one embodiment of the present invention.

A general wireless telephone network is illustrated in FIG. 1. Multiple cells 111b, 112b and 113b are established through the use of antennas 111a, 112a and 113a. Devices 101–104 having access to the cellular telephone network are able to move from cell to cell and maintain access with the network. Each antenna 111a–113a has a connection 120 with a service provider 130. The service provider 130 controls access to the network and coordinates the handing-off of access as the devices pass between the cells. The service provider identifies each device and routes communication to the proper location of the particular device. Commonly, the devices 101–104 may be cellular telephones, computers with wireless modems and other devices that exchange information with the service provider.

Figure 3:
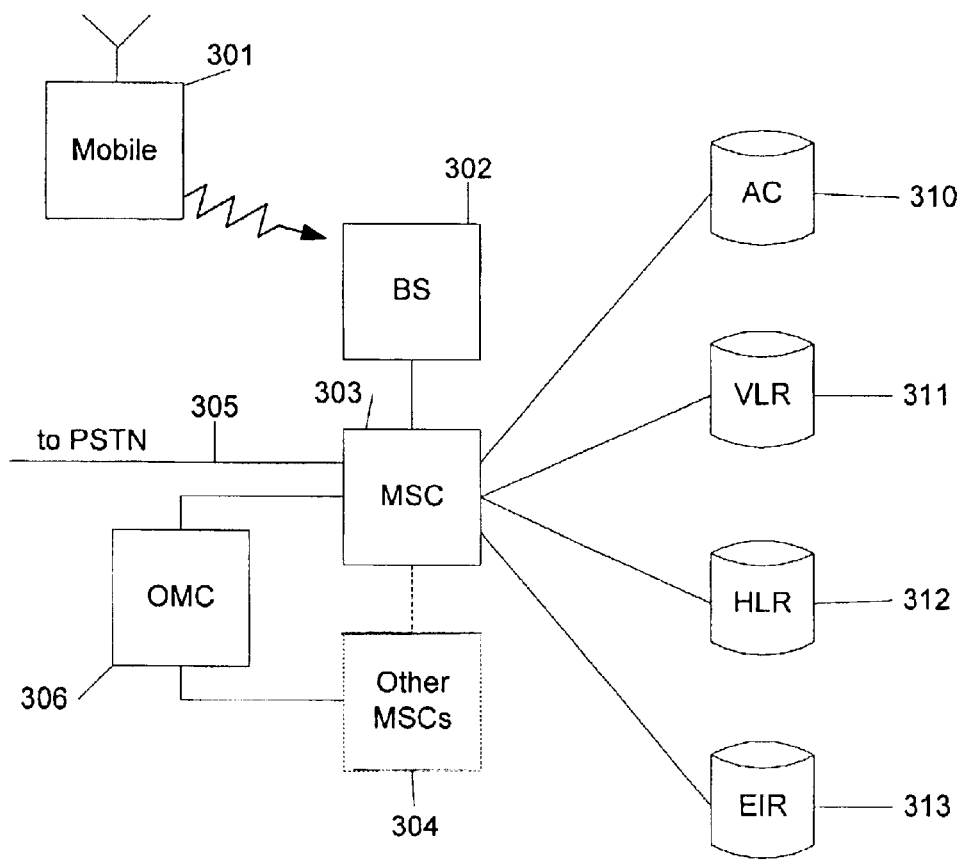
FIG. 3 illustrates a schematic of a section of a wireless cellular telephone network, according to one embodiment of the present invention.

With respect to the wireless telephone service provider, a general view of the infrastructure of the service provider is illustrated in FIG. 3. A mobile unit 301 communicates with a base station 302. The base station acts as a high-capacity switch which provides total overview and control of radio functions, management of radio network resources and handling of cell configuration data. There are multiple base stations in a cell network and those base stations react and coordinate with a mobile switching center 303. The overall network may have multiple mobile switching centers, where all of the centers are connected to the operation maintenance center 306. In either case, the mobile switch center interacts with remote databases and the public switched telephone network or PSTN 305. The mobile switch center checks that a customer has a valid account before allowing the connection to be made, delivers subscriber services such as Caller ID, and pages the mobile unit 301 when a call comes in. These databases could include the home Location Register (HLR) 312, the Visitor Location Register (VLR) 311, the Authentication Center (AC) 310, and the Equipment Identity Register (EIR) 313, and others.

Figure 2:
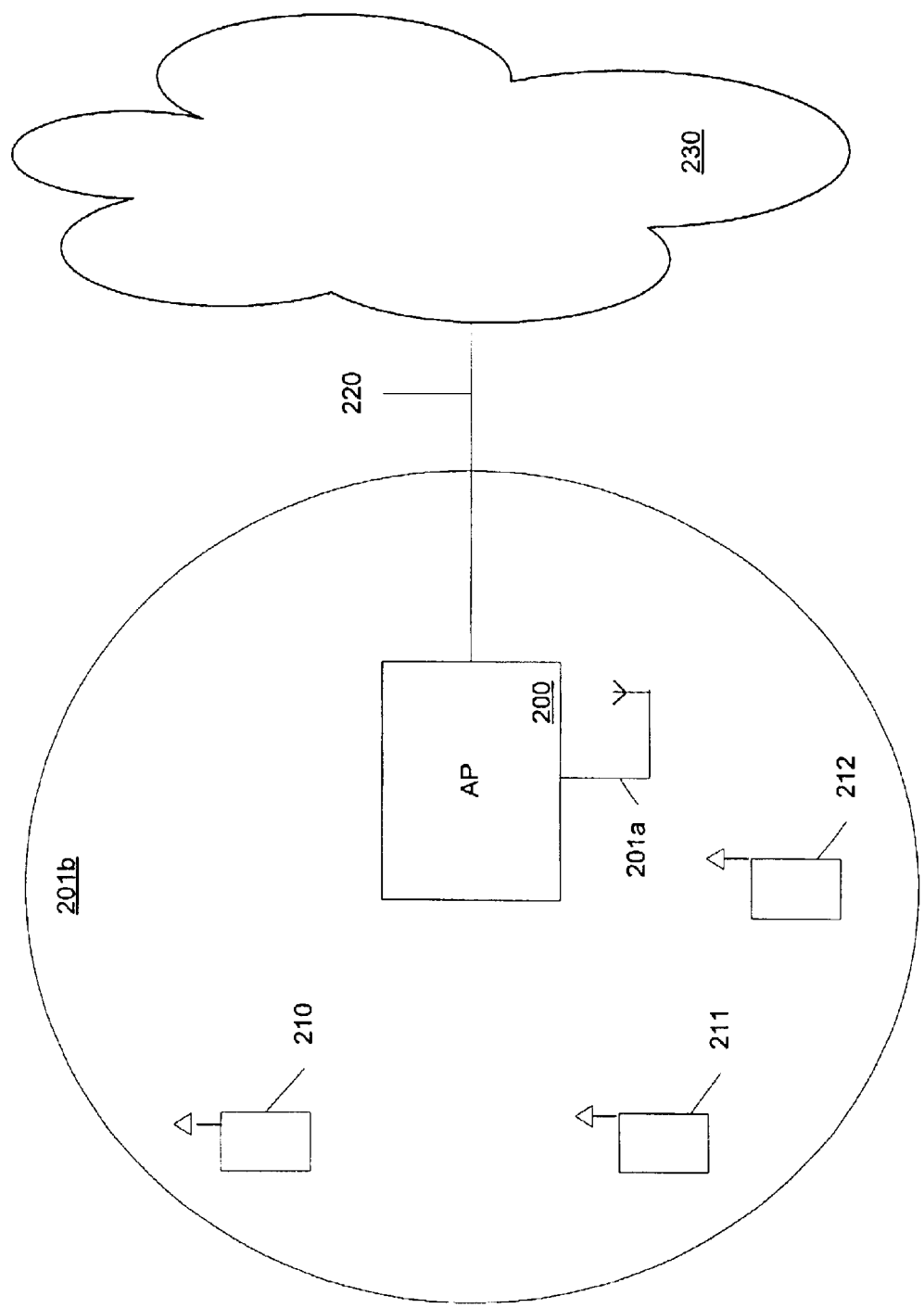
FIG. 2 illustrates a schematic representation of a wireless hotspot with an access point and several wireless devices, according to one embodiment of the present invention.

A general wireless hotspot installation is illustrated in FIG. 2. The hotspot may be controlled through an access point 200, with the access point having an antenna 201a to establish a wireless access zone 201b. The wireless access may be made through an IEEE 802.11 standard local area network (LAN) or some other type of wireless network. Devices 210–212 within the hotspot are able to communicate with the larger network 230 through communication with the access point 200. The access point 200 has a communication link 220 with the larger network 230 and the access point acts to mediate communication between the devices 210–212 and the larger network and between the devices themselves. As examples, the devices 210–212 may be computers equipped with 802.11 access cards, personal data assistants enabled for wireless access and cellular telephones having multiple means for wireless access. The larger network may be the Internet or a private wide area network, such as an intranet of a service provider.

Figure 4:
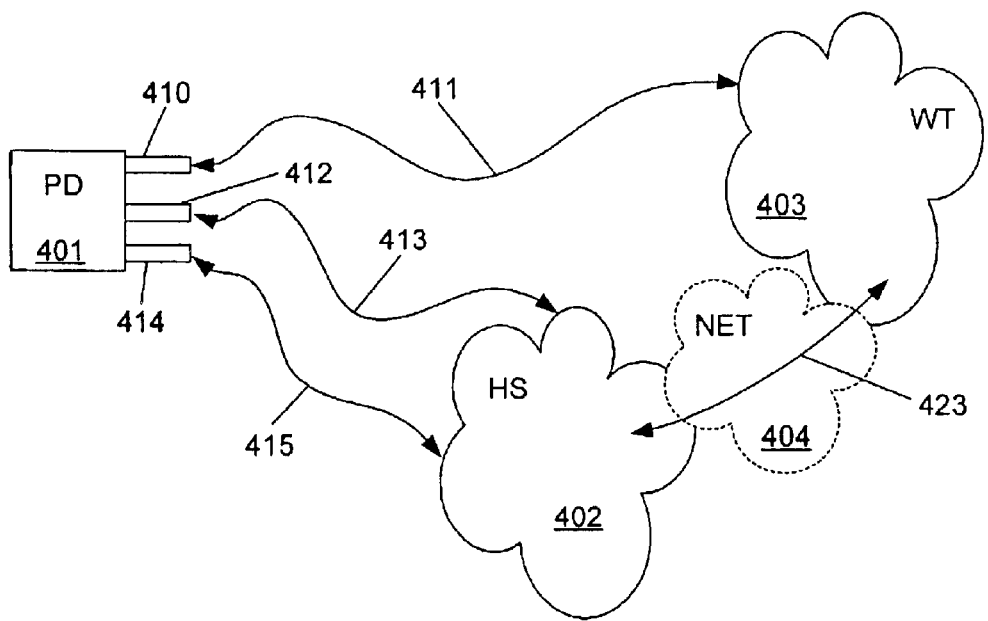
FIG. 4 provides a schematic illustrating the process of exchange of verification and billing information, according to a first embodiment of the present invention.

A first embodiment of the invention is illustrated in FIG. 4. A portable device 401 is illustrated having access to portions of the wireless environment. The portable device 401 may be a wireless telephone, a laptop computer, a semi-stationary computer, a personal data assistant, a mobile multimedia gateway, a computer storage device or a camera with wireless communication capabilities. In this wireless-based billing process, the portable device 401 may have several portions that provide exchange of wireless data. A first portion 410 provides access to a wide area network (WAN) 403. The first portion 410 may be a wireless modem card for the portable device that may provide access to the WAN and/or a wireless telephone network 403, with those networks respective infrastructure. In some embodiments, other wireless forms of communication are utilized by the first portion 410, such as Global System for Mobile Communications (GSM), Code Division Multiple Access, or Time Division Multiple Access. The first portion 410 provides access through a wireless connection 411 to the WAN, etc. 403 and authentication, security and billing information is exchanged via the wireless connection 411.

The portable device 401 also has other wireless access portions. Another, second, portion 412 provides wide local area network (WLAN) access, such as IEEE 802.11, to the hotspot 402. Data specific to the WLAN network, such as packet data sent to and received from a larger network, are passed through the wireless connection 413 between the hotspot 402 and the second portion 412. A third portion 414 that may be included with the portable device 401 is a portion that provides wide personal area network (WPAN), such as IEEE 802.15.3, BLUETOOTH™, short-range wireless communication standard, and ultra wideband communications. The third portion 414 can communicate through a wireless connection 415 to connect with local devices in the hotspot 402, such as printers, access terminals, etc. that operate at shorter communication distances. It is also noted that WAN network 403 and the hotspot 402 are connected through another network 404, that both have access to. The other network 404 can be the Internet or a private internet or other network.

The billing process according to the first embodiment illustrated in FIG. 4 would occur as follows. A user of the portable device 401 would enter the area of the hotspot 402 and would seek access. The first portion 410 of the portable device would access the WAN 403 network seeking billing authorization. Normally, user would have previously setup an account with the access provider of the WAN. Additionally, it is possible for the user to setup an account at the time of the access session with the hotspot 402. For example, if the WAN service provider is the service provider for a wireless telephone system, the user could previously have established an account for wireless hotspot access or made such access part of their existing account. The portable device receives a reply to its billing authorization query through the wireless communication link 411. The reply can include a denial of the access session for reasons determined by the service provider of the WAN or can indicate that the access session has been authorized for billing.

In one embodiment, the portable device could transmit information based on data received from the WAN 403 through to the hotspot 402 through the wireless communications links 413 and/or 415. In another embodiment, the WAN 403 would transmit authorization data to the hotspot 402 through the network 404 through a communication 423. The communication 423 may be through a cable, T1, T3, digital subscriber line (DSL) or other landline communications medium. In this latter embodiment, the hotspot 402 would then have billing authorization information for the portable device 401 and would seek to authenticate the portable device and provide access to the hotspot services to the portable device.

The use of the portable device is monitored and billing information is maintained about the portable device. Different services used may be charged at different rates, such that the amount of data, the type of data or a supplied data rate may cause different charges to accrue. The user of the portable device may indicate an end of an access session through the first portion 410 to the WAN 403 or may end a session by detaching from the hotspot 402 or simply being timed-out for a lack of access by the hotspot. After the end of the session, billing information may be passed back to the WAN 403, informing about the end of the session and the charges that have accrued. The user would be subsequently billed through the billing procedures of the WAN service provider that has authorized the access session.

Figure 5:
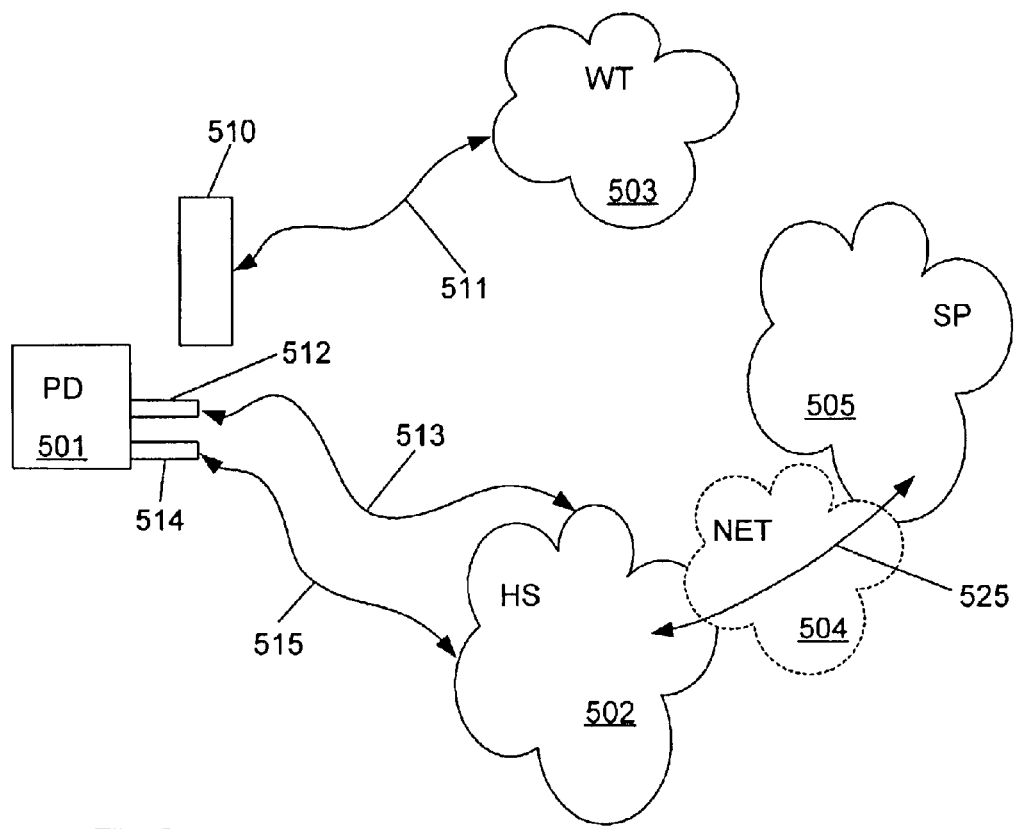
FIG. 5 provides a schematic illustrating the process of exchange of verification and billing information, according to a second embodiment of the present invention.

In a second embodiment, illustrated in FIG. 5, the portable device has second and third portions 512 and 514 to provide access to the WLAN and WPAN, respectively, through wireless communication links 513 and 515. This could be instead of or in addition to elements comparable to the first portion 401. Similar to the first embodiment, the hotspot 502 can communicate with a service provider 505 through a communication line 525, usually through the large network 504.

In this embodiment, billing access is achieved through the use of a wireless telephone 510 that is separate from the portable device. The wireless telephone 510 connects through a communication link 511 to a wireless telephone provider 503 and seeks billing authorization. Thereafter, the process proceeds similarly to the first embodiment, with the wireless telephone provider 503 providing billing authorization information to either the hotspot 502 or the service provider 505. Additionally, the wireless telephone provider 503 and the service provider 505 may be the same in some embodiments; those embodiments are then the same as the first embodiment with the exception that the wireless telephone is not integrated with the other portions of the portable device.

Figure 6:
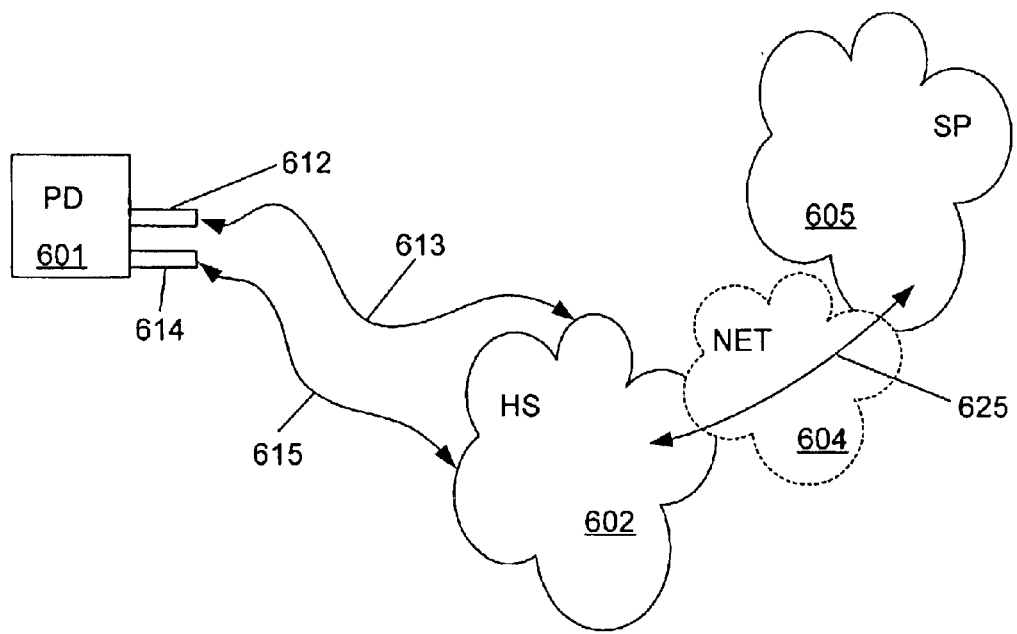
FIG. 6 provides a schematic illustrating the process of exchange of verification and billing information, according to a third embodiment of the present invention.

A third embodiment is illustrated in FIG. 6. In this embodiment a portable device 601 has second and third portions 612 and 614 to provide access through the WLAN and WPAN, respectively, through wireless communication links 613 and 615. The hotspot 602 communicates with a service provider 605 through a communication line 625, possibly through the large network 604. In this embodiment, the authentication and billing information exchange is "web-based" and occurs between the hotspot 602 and the portable device 601.

According to this embodiment, it is possible for the authentication and billing data to be passed on to the service provider 605 or for the data to stay resident in the hotspot 602. The former case would occur when a user of the portable device enters the area of the hotspot 602 and provides data, such as a billing number or a wireless telephone number. That supplied data would be passed to the service provider for authentication and billing before allowing access to services of the hotspot. In the latter case, the data stays resident at the hotspot, as would be the case when the user has an account specific to that hotspot only. In the case of "local" billing of the access to the hotspot, it is also possible that some sort of sharing of revenue may occur between the service provider and the hotspot because the hotspot is taking on some of the authorization and billing functions.

Figure 7:
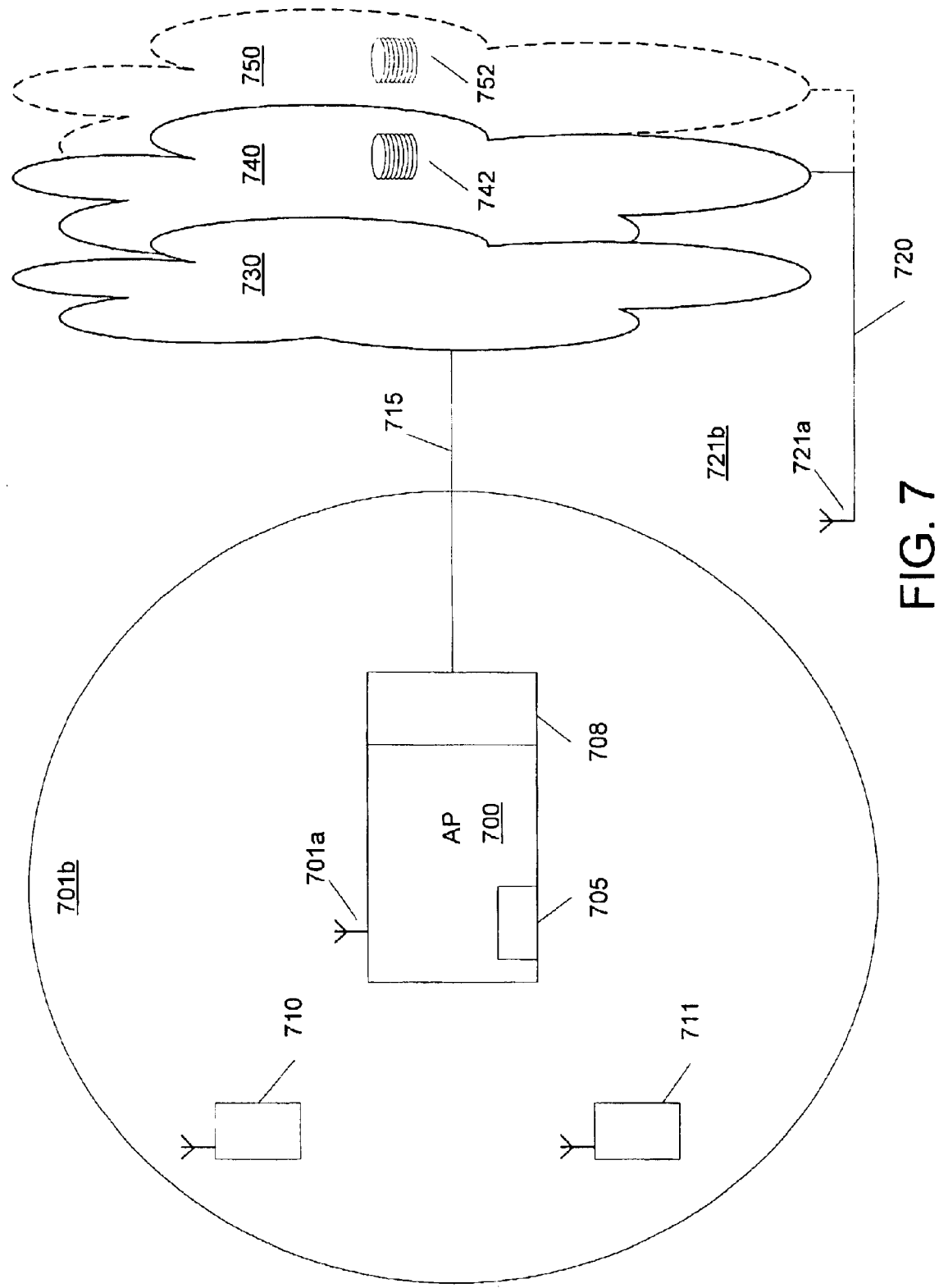
FIG. 7 illustrates a schematic of a wireless hotspot with connections to different network entities, according to an embodiment of the present invention.

FIG. 7 illustrates another embodiment of the present invention. A wireless hotspot is illustrated, with the coverage of the hotspot set by the access point 700 through an antenna 701a, the range of the hotspot is illustrated by the range 701b. Devices 710 and 711 within the range 701b may potentially establish a connection with the hotspot. The access to the access point is controlled through the access controller 705, that may be hardware, firmware, software or a combination thereof. A communication connection 715 is established between the access point 700 and the larger network 730 where that connection is modulated by a router 708.

Also illustrated in FIG. 7 is a wireless telephone service provider 740. The service provider 740 contains a database 742 of users of the wireless telephone network. The wireless telephone service provider provides services through an antenna 721a, through a connection 720, to provide a coverage area 721b. The coverage area 721b for the wireless telephone service may also include some or all of the wireless hotspot range 701b.

In another embodiment of the present invention, a third party would act as an agent for the service provider and would create the incentive for establishing the hotspot locations. In this embodiment, the service provider, such as a wireless telephone provider 750 would have account information for the user in its database 752. The third party company 740 could act as a go-between and would maintain its own records of users in its own database 742. The benefit of the third party company in this embodiment of the present invention is that the company would provide the interface between the wireless hotspot and the service provider and would not require any direct interaction between the service provider and the wireless hotspot. Another benefit of the third party company embodiment is that users could supply account data for accounts they have with entities other than the wireless telephone service provider, such as a television cable company or an Internet service provider.

Figure 8:
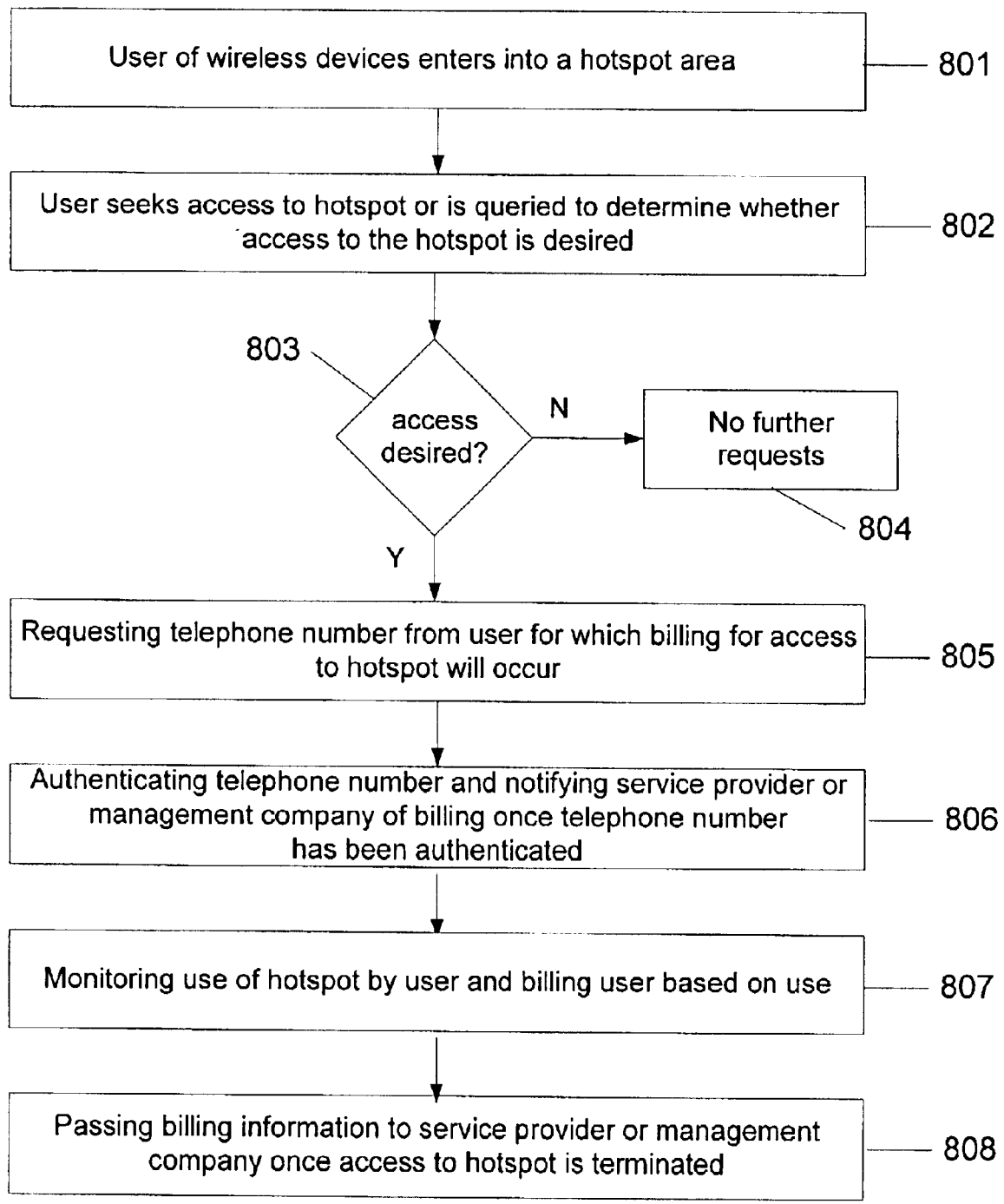
FIG. 8 illustrates a flowchart of the process of coordinating the billing of a user for wireless access, according to another embodiment of the present invention.

The process of billing for use of a wireless hotspot, according to one embodiment, is illustrated in FIG. 8. The user of a wireless device enters into a hotspot at step 801. The user seeks access to the hotspot or the user is queried to determine whether access to the hotspot is desired at step 802 if the portable device of the user is operating in a "promiscuous" mode. If access is not desired, then no further requests are made of the user at step 804. If access is desired, then identifying information is requested. In the case of the specific embodiment illustrated, a telephone number is requested for the user to use as a billing identifier at step 805. The identifying information is authenticated by contacting the entity issuing the identifying information, or in the case of a telephone number, the telephone company issuing the telephone number is contacted at step 806. It is possible that a user could supply a telephone number for which no wireless charges are authorized so that a telephone number that has been preauthorized for wireless access should be entered by the user. Additional corroborating information may also be required along with the telephone based on services offered by entity issuing the telephone number. In one embodiment, when a wireless telephone number is used as the identifying information, the authentication used for wireless telephone communication may be employed.

After the user has been authenticated for wireless hotspot access, the user is monitored for usage at step 807. The user is billed for the access, with the billing being based on the time of use of the hotspot, for the amount of data transmitted and/or received, or some other measurement agreed upon by the user and the authorizing entity or agreed upon in a Service Level Agreement. With respect to billing for the amount of data transmitted and/or received, such a metric can be achieved through counting the number of packets sent or received by the wireless device. After the user has terminated the session with the wireless hotspot, the billing information generated is passed on to the service provider or a third party management company at step 808. If no third party company is involved, the format of the data is changed to a format that is recognized by the service provider. In the case of a wireless telephone service provider, the format would be similar to the format of data sent from a base station to a mobile switching service. In the case of a third party company, the format of the billing information would be whatever format that is required by the third party company.

Figure 9:
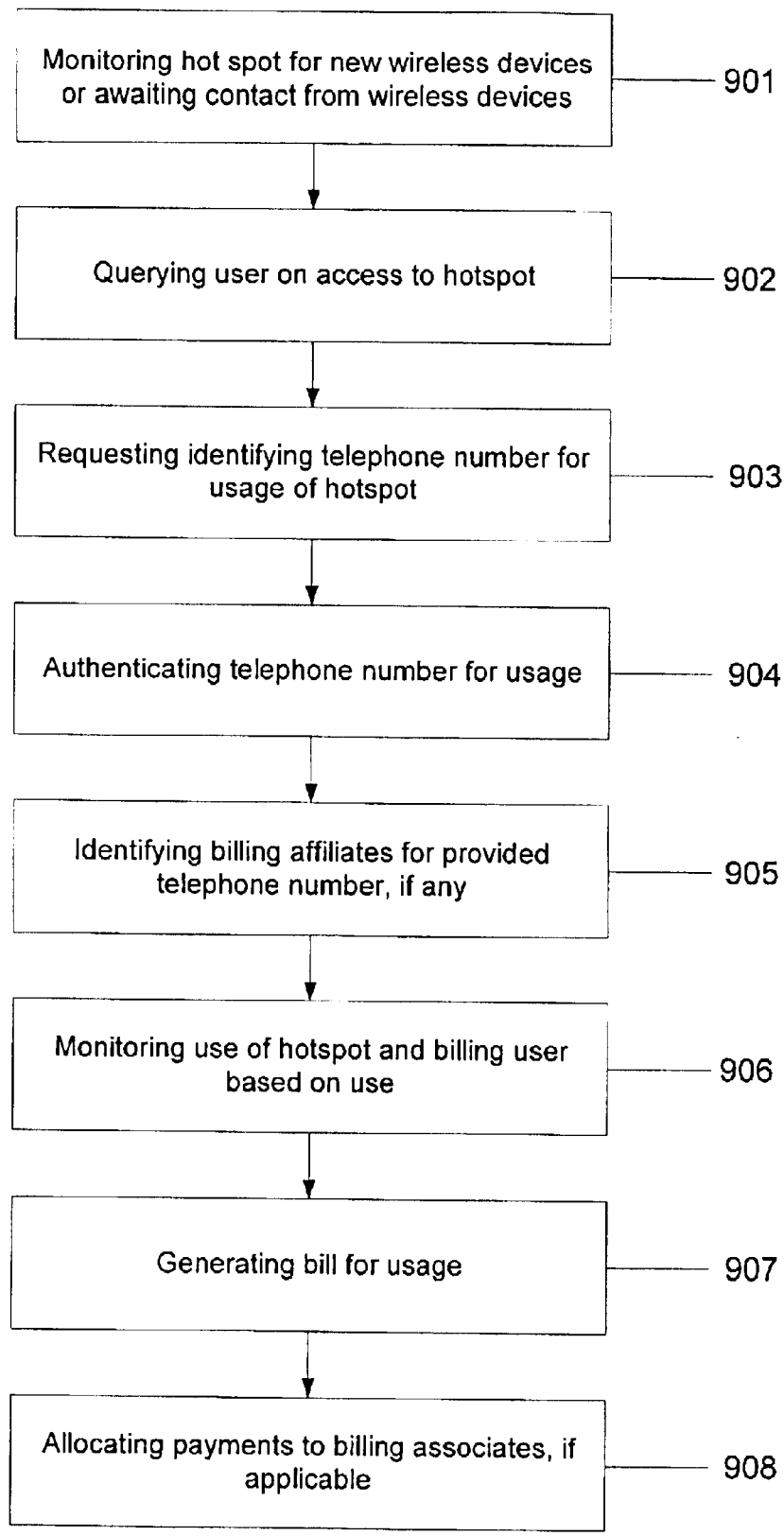
FIG. 9 illustrates a flowchart of the process of coordinating the billing of a user for wireless access, according to one embodiment of this invention.

The process of billing for access to a wireless hotspot, according to another embodiment, is illustrated in FIG. 9. In this embodiment, the access point for the wireless hotspot monitors for new wireless devices that enter into the coverage area at step 901. Once discovered, the wireless device is queried at step 902 to determine if access is desired. An identifying telephone number is requested at step 903 from the user for access to the hotspot. The telephone number is authenticated at step 904 for usage of the telephone number for billing. If billing affiliates for the provided telephone number are present, the attributes of billing affiliates are identified at step 905. In this embodiment, the billing affiliates can be a wireless telephone provider if a third party company is used or can be some other entity receiving some percentage of billing for use. The latter case can occur if the proprietors of the hotspot location have an agreement with the wireless telephone provider or the third party company to receive some percentage for the right to maintain the hotspot in its location.

The use of the hotspot by the wireless device is monitored and the user of the device is billed based on usage at step 906. Once the access session is over, a bill is generated at step 907 and forwarded to the billing entity for the telephone number provided by the user. At that point, if any allocated payments to billing associates are to be made, they are passed on to the billing associates at step 908.

The billing control system allows for users of wireless devices within the hotspot area to identify themselves and seek authorization from a billing party. The billing party could be a wireless telephone service provider or a third party company or the wireless hotspot itself can be used to monitor and secure billing information. After or during use of the hotspot, a bill for the user is generated and payments to billing affiliates are allocated, if any. According to this billing control process, a user would receive a single bill, with charges for both the wireless hotspot usage and other charges from the billing party.

It is noted that the present application is directed, at least in part, to wireless hotspots. The use of the term wireless hotspot or hotspot is applicable to any wireless access point. The term wireless hotspot or hotspot, as used in the specification and claims, should not be construed to be limited to a single type of locale or be construed as providing access according to only a particular wireless access format, such as the IEEE 802.11 standard. It would also be within the scope of the invention to implement the disclosed elements of the invention in discrete electronic components, thereby taking advantage of the functional aspects of the invention. Additionally, the present invention can be implemented totally or partially through software.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A process of billing for access to and use of a wireless hotspot by a portable device, said process comprising:
   detecting a signal from the wireless hotspot;
   requesting access to the wireless hotspot;
   awaiting a reply to the access request from the wireless hotspot;
   supplying account information to an access providing entity;
   awaiting a billing authorization from the access providing entity; and
   exchanging data with the wireless hotspot by the portable device when a billing authorized is received from the access providing entity;
   wherein the account information is used to keep track of charges accrued through the access to and use of the wireless hotspot by the portable device.

2. A process as recited in claim 1, wherein said step of supplying account information comprises supplying account information to the wireless hotspot.

3. A process as recited in claim 1, wherein said step of supplying account information comprises supplying account information to a service provider.

4. A process as recited in claim 3, wherein said step of supplying account information to a service provider comprises supplying account information to a wireless telephone service provider, wherein the account information is one of a wireless telephone number and a wireless telephone account number.

5. A process as recited in claim 3, wherein said step of supplying account information to a service provider comprises supplying account information to a landline telephone service provider, wherein the account information is one of a landline telephone number and a landline telephone account number.

6. A process as recited in claim 1, wherein said step of supplying account information comprises supplying account information to a third party service provider, wherein the third party service provider receives the account information and transfers data specific to one of a landline telephone service provider, a wireless telephone service provider and an internet service provider, where the specific data is used to keep track of charges accrued through the access to and use of the wireless hotspot by the portable device.

7. A process as recited in claim 1, wherein said step of supplying account information comprises supplying account information to a wireless telephone service provider through a wireless telephone portion of the portable device.

8. A process as recited in claim 1, wherein said step of supplying account information comprises supplying account information to a wireless telephone service provider through a wireless telephone that is separate from the portable device.

9. A process as recited in claim 1, wherein said step of exchanging data with the wireless hotspot by the portable device comprises exchanging data with the wireless hotspot by the portable device via at least one of an IEEE 802.11 format, an IEEE 802.15.3 format, a short-range wireless communication standard format and an ultra wideband format.

10. A process of billing for access to and use of a wireless hotspot by a portable device, said process comprising:
sending a signal inviting portable devices to seek access to the wireless hotspot;
awaiting a reply to the signal from the portable device;
requesting account information with the account information being specific to an access providing entity;
receiving authorization information from one of the portable device and the access providing entity;
authorizing access to the wireless hotspot by the portable device, when the received authorization information is determined to authorize access to the wireless hotspot;
exchanging data with the wireless hotspot by the portable device subsequent to authorizing access to the wireless hotspot;
wherein the account information is used to keep track of charges accrued through the access to and use of the wireless hotspot by the portable device.

11. A process as recited in claim 10, wherein said step of receiving authorization information comprises receiving authorization information from the portable device.

12. A process as recited in claim 10, wherein said step of receiving authorization information comprises receiving authorization information from a service provider.

13. A process as recited in claim 12, wherein said step of receiving authorization information from a service provider comprises receiving authorization information from a wireless telephone service provider, wherein the wireless telephone service provider authorizes the portable device based on one of a wireless telephone number and a wireless telephone account number.

14. A process as recited in claim 12, wherein said step of receiving authorization information from a service provider comprises receiving authorization information from a landline telephone service provider, wherein the landline telephone service provider authorizes the portable device based on one of a landline telephone number and a landline telephone account number.

15. A process as recited in claim 10, wherein said step of receiving authorization information comprises receiving authorization information from a third party service provider, wherein the third party service provider receives the account information from the portable device and transfers data specific to one of a landline telephone service provider, a wireless telephone service provider and an internet service provider, where the specific data is used to keep track of charges accrued through the access to and use of the wireless hotspot by the portable device.

16. A process as recited in claim 10, wherein said step of receiving authorization information comprises receiving authorization information from a wireless telephone service provider based on account information received by the wireless telephone service provider through a wireless telephone portion of the portable device.

17. A process as recited in claim 10, wherein said step of receiving authorization information comprises receiving authorization information from a wireless telephone service provider based on account information received by the wireless telephone service provider through a wireless telephone that is separate from the portable device.

18. A process as recited in claim 10, wherein said step of exchanging data with the wireless hotspot by the portable device comprises exchanging data with the wireless hotspot by the portable device via at least one of an IEEE 802.11 format, an IEEE 802.15.3 format, a short-range wireless communication standard format and an ultra wideband format.

19. A process as recited in claim 10, further comprising:
monitoring the use of the wireless hotspot by the portable device; and
generating billing information related to the monitored use of the wireless hotspot by the portable device.

20. A process as recited in claim 19, further comprising sending the generated billing information to the access providing entity.

21. A process as recited in claim 19, further comprising generating a bill based on the billing information by the wireless hotspot.

22. A billing processor for billing of access to and use of a wireless hotspot by a portable device, said billing processor comprising:
detecting means for detecting a signal from the wireless hotspot;
requesting means for requesting access to the wireless hotspot;
first timing means for awaiting a reply to the access request from the wireless hotspot;
supplying means for supplying account information to an access providing entity;
second timing means for awaiting a billing authorization from the access providing entity; and
communication means for exchanging data with the wireless hotspot by the portable device when a billing authorized is received from the access providing entity;
wherein the account information is used to keep track of charges accrued through the access to and use of the wireless hotspot by the portable device.

23. A billing processor as recited in claim 22, wherein said supplying means comprises supplying means for supplying account information to the wireless hotspot.

24. A billing processor as recited in claim 22, wherein said supplying means comprises supplying means for supplying account information to a service provider.

25. A billing processor as recited in claim 24, wherein said supplying means comprises supplying means for supplying account information to a wireless telephone service provider, wherein the account information is one of a wireless telephone number and a wireless telephone account number.

26. A billing processor as recited in claim 24, wherein said supplying means comprises supplying means for supplying account information to a landline telephone service provider, wherein the account information is one of a landline telephone number and a landline telephone account number.

27. A billing processor as recited in claim 22, wherein said supplying means comprises supplying means for supplying account information to a third party service provider, wherein the third party service provider receives the account information and transfers data specific to one of a landline telephone service provider, a wireless telephone service provider and an internet service provider, where the specific data is used to keep track of charges accrued through the access to and use of the wireless hotspot by the portable device.

28. A billing processor as recited in claim 22, wherein said supplying means comprises supplying means for supplying account information to a wireless telephone service provider through a wireless telephone portion of the portable device.

29. A billing processor as recited in claim 22, wherein said supplying means comprises supplying means for supplying account information to a wireless telephone service provider through a wireless telephone that is separate from the portable device.

30. A billing processor as recited in claim 22, wherein said communication means comprises exchanging means for exchanging data with the wireless hotspot by the portable device via at least one of an IEEE 802.11 format, an IEEE 802.15.3 format, a short-range wireless communication standard format and an ultra wideband format.

31. A billing processor for billing of access to and use of a wireless hotspot by a portable device, said billing processor comprising:

sending means for sending a signal inviting portable devices to seek access to the wireless hotspot;

timing means for awaiting a reply to the signal from the portable device;

requesting means for requesting account information with the account information being specific to an access providing entity;

receiving means for receiving authorization information from one of the portable device and the access providing entity;

authorizing means for authorizing access to the wireless hotspot by the portable device, when the received authorization information is determined to authorize access to the wireless hotspot;

communications means for exchanging data with the wireless hotspot by the portable device subsequent to authorizing access to the wireless hotspot;

wherein the account information is used to keep track of charges accrued through the access to and use of the wireless hotspot by the portable device.

32. A billing processor as recited in claim 31, wherein said receiving means comprises receiving means for receiving authorization information from the portable device.

33. A billing processor as recited in claim 31, wherein said receiving means comprises receiving means for receiving authorization information from a service provider.

34. A billing processor as recited in claim 33, wherein said receiving means comprises receiving means for receiving authorization information from a wireless telephone service provider, wherein the wireless telephone service provider authorizes the portable device based on one of a wireless telephone number and a wireless telephone account number.

35. A billing processor as recited in claim 33, wherein said receiving means comprises receiving means for receiving authorization information from a landline telephone service provider, wherein the landline telephone service provider authorizes the portable device based on one of a landline telephone number and a landline telephone account number.

36. A billing processor as recited in claim 31, wherein said receiving means comprises receiving means for receiving authorization information from a third party service provider, wherein the third party service provider receives the account information from the portable device and transfers data specific to one of a landline telephone service provider, a wireless telephone service provider and an internet service provider, where the specific data is used to keep track of charges accrued through the access to and use of the wireless hotspot by the portable device.

37. A billing processor as recited in claim 31, wherein said receiving means comprises receiving means for receiving authorization information from a wireless telephone service provider based on account information received by the wireless telephone service provider through a wireless telephone portion of the portable device.

38. A billing processor as recited in claim 31, wherein said receiving means comprises receiving means for receiving authorization information from a wireless telephone service provider based on account information received by the wireless telephone service provider through a wireless telephone that is separate from the portable device.

39. A billing processor as recited in claim 31, wherein said communication means comprises exchanging means for exchanging data with the wireless hotspot by the portable device via at least one of an IEEE 802.11 format, an IEEE 802.15.3 format, a short-range wireless communication standard format and an ultra wideband format.

40. A billing processor as recited in claim 31, further comprising:

monitoring means for monitoring the use of the wireless hotspot by the portable device; and generating means for generating billing information related to the monitored use of the wireless hotspot by the portable device.

41. A billing processor as recited in claim 40, further comprising second sending means for sending the generated billing information to the access providing entity.

42. A billing processor as recited in claim 40, further comprising generating means for generating a bill based on the billing information by the wireless hotspot.

43. A billing processor for billing of access to and use of a wireless hotspot by a portable device, said billing processor comprising:

a detector for detecting a signal from the wireless hotspot;

a requestor for requesting access to the wireless hotspot;

a first timer for awaiting a reply to the access request from the wireless hotspot;

a first supplier for supplying account information to an access providing entity;

a second timer for awaiting a billing authorization from the access providing entity; and a communicator for exchanging data with the wireless hotspot by the portable device when a billing authorized is received from the access providing entity;

wherein the account information is used to keep track of charges accrued through the access to and use of the wireless hotspot by the portable device.

44. A billing processor as recited in claim 43, wherein said first supplier comprises a second supplier for supplying account information to the wireless hotspot.

45. A billing processor as recited in claim 43, wherein said first supplier comprises a second supplier for supplying account information to a service provider.

46. A billing processor as recited in claim 45, wherein said second supplier comprises a third supplier for supplying account information to a wireless telephone service provider, wherein the account information is one of a wireless telephone number and a wireless telephone account number.

47. A billing processor as recited in claim 45, wherein said second supplier comprises a third supplier for supplying account information to a landline telephone service provider, wherein the account information is one of a landline telephone number and a landline telephone account number.

48. A billing processor as recited in claim 43, wherein said first supplier comprises a second supplier for supplying account information to a third party service provider, wherein the third party service provider receives the account information and transfers data specific to one of a landline telephone service provider, a wireless telephone service provider and an internet service provider, where the specific data is used to keep track of charges accrued through the access to and use of the wireless hotspot by the portable device.

49. A billing processor as recited in claim 43, wherein said first supplier comprises a second supplier for supplying account information to a wireless telephone service provider through a wireless telephone portion of the portable device.

50. A billing processor as recited in claim 43, wherein said first supplier comprises a second supplier for supplying account information to a wireless telephone service provider through a wireless telephone that is separate from the portable device.

51. A billing processor as recited in claim 43, wherein said communicator comprises an exchanger for exchanging data with the wireless hotspot by the portable device via at least one of an IEEE 802.11 format, an IEEE 802.15.3 format, a short-range wireless communication standard format and an ultra wideband format.

52. A billing processor for billing of access to and use of a wireless hotspot by a portable device, said billing processor comprising:
 a sender for sending a signal inviting portable devices to seek access to the wireless hotspot; and
 a timer for awaiting a reply to the signal from the portable device;
 a requester for requesting account information with the account information being specific to an access providing entity;
 a receiver for receiving authorization information from one of the portable device and the access providing entity;
 an authorizer for authorizing access to the wireless hotspot by the portable device, when the received authorization information is determined to authorize access to the wireless hotspot; and
 a communicator for exchanging data with the wireless hotspot by the portable device subsequent to authorizing access to the wireless hotspot;
 wherein the account information is used to keep track of charges accrued through the access to and use of the wireless hotspot by the portable device.

53. A billing processor as recited in claim 52, wherein said receiver comprises a second receiver for receiving authorization information from the portable device.

54. A billing processor as recited in claim 52, wherein said receiver comprises a second receiver for receiving authorization information from a service provider.

55. A billing processor as recited in claim 54, wherein said second receiver comprises a third receiver for receiving authorization information from a wireless telephone service provider, wherein the wireless telephone service provider authorizes the portable device based on one of a wireless telephone number and a wireless telephone account number.

56. A billing processor as recited in claim 54, wherein said second receiver comprises a third receiver for receiving authorization information from a landline telephone service provider, wherein the landline telephone service provider authorizes the portable device based on one of a landline telephone number and a landline telephone account number.

57. A billing processor as recited in claim 52, wherein said receiver comprises a second receiver for receiving authorization information from a third party service provider, wherein the third party service provider receives the account information from the portable device and transfers data specific to one of a landline telephone service provider, a wireless telephone service provider and an internet service provider, where the specific data is used to keep track of charges accrued through the access to and use of the wireless hotspot by the portable device.

58. A billing processor as recited in claim 52, wherein said receiver comprises a second receiver for receiving authorization information from a wireless telephone service provider based on account information received by the wireless telephone service provider through a wireless telephone portion of the portable device.

59. A billing processor as recited in claim 52, wherein said receiver comprises a second receiver for receiving authorization information from a wireless telephone service provider based on account information received by the wireless telephone service provider through a wireless telephone that is separate from the portable device.

60. A billing processor as recited in claim 52, wherein said communicator comprises an exchanger for exchanging data with the wireless hotspot by the portable device via at least one of an IEEE 802.11 format, an IEEE 802.15.3 format, a short-range wireless communication standard format and an ultra wideband format.

61. A billing processor as recited in claim 52, further comprising:
 a monitor for monitoring the use of the wireless hotspot by the portable device; and
 a generator for generating billing information related to the monitored use of the wireless hotspot by the portable device.

62. A billing processor as recited in claim 61, further comprising a second sender for sending the generated billing information to the access providing entity.

63. A billing processor as recited in claim 61, further comprising a bill generator for generating a bill based on the billing information by the wireless hotspot.

* * * * *